US012344499B2

(12) United States Patent
Shoji et al.

(10) Patent No.: US 12,344,499 B2
(45) Date of Patent: Jul. 1, 2025

(54) SHEET PROCESSING APPARATUS AND IMAGE FORMING SYSTEM

(71) Applicant: CANON KABUSHIKI KAISHA, Tokyo (JP)

(72) Inventors: Ryuhei Shoji, Shizuoka (JP); Yasuhiro Nakahara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 439 days.

(21) Appl. No.: 17/975,831

(22) Filed: Oct. 28, 2022

(65) Prior Publication Data

US 2023/0150789 A1 May 18, 2023

(30) Foreign Application Priority Data

Nov. 17, 2021 (JP) ................................ 2021-186730

(51) Int. Cl.
*B26D 7/18* (2006.01)
*B26F 1/44* (2006.01)
(Continued)

(52) U.S. Cl.
CPC ............... *B65H 43/08* (2013.01); *B26F 1/44* (2013.01); *B65H 37/00* (2013.01); *B65H 2301/531* (2013.01); *B65H 2801/27* (2013.01)

(58) Field of Classification Search
CPC .. B65H 43/08; B65H 37/00; B65H 2301/531; B65H 2511/24; B65H 2801/27;
(Continued)

(56) References Cited

U.S. PATENT DOCUMENTS 8,091,882 B2 * 1/2012 Iguchi .................... B65H 29/14 270/58.17
8,181,950 B2 * 5/2012 Kato .................. G03G 15/6582 270/58.07
(Continued)

FOREIGN PATENT DOCUMENTS

JP H10279170 A 10/1998
JP 2007076876 A 3/2007
(Continued)

OTHER PUBLICATIONS

Espacenet machine translation of JP2007076876A; https://translationportal.epo.org/emtp/translate/?ACTION=description-retrieval& COUNTRY=JP&ENGINE=google&FORMAT=docdb &KIND=A&LOCALE=en_EP&NUMBER=2007076876&OPS=ops.epo.org/3.2&SRCLANG=ja&TRGLANG=en (Year: 2007).*

*Primary Examiner* — Leslie A Nicholson, III
(74) *Attorney, Agent, or Firm* — ROSSI, KIMMS & McDOWELL LLP

(57) ABSTRACT

A sheet processing apparatus includes a conveyance unit configured to convey a sheet in a sheet conveyance direction, a punching unit configured to punch a hole to the sheet being conveyed by the conveyance unit, a moving unit configured to move the punching unit in an intersecting direction intersecting the sheet conveyance direction, a detection unit arranged upstream of the punching unit in the sheet conveyance direction and configured to change an output value based on a position of an edge portion, in the intersecting direction, of the sheet being conveyed, a cleaning portion configured to clean the detection unit, and an interlocking portion configured to move the cleaning portion so as to clean the detection unit by interlocking with a movement of the punching unit in the intersecting direction.

18 Claims, 9 Drawing Sheets

(51) Int. Cl.
*B65H 37/00* (2006.01)
*B65H 43/08* (2006.01)

(58) Field of Classification Search
CPC . B26F 1/02; B26F 1/0092; B26F 1/44; B26D 7/18; G03G 15/6573; G03G 15/6582; G03G 2215/00818
See application file for complete search history.

(56) References Cited

U.S. PATENT DOCUMENTS

| | | | | |
|---|---|---|---|---|
| 8,346,155 | B2 * | 1/2013 | Iwata | B65H 35/04 399/407 |
| 11,279,586 | B2 | 3/2022 | Nakahara | |
| 11,390,482 | B2 | 7/2022 | Endo | |
| 2019/0346803 | A1 | 11/2019 | Toyoizumi et al. | |

FOREIGN PATENT DOCUMENTS

| | | | |
|---|---|---|---|
| JP | 2019196263 | A | 11/2019 |
| JP | 2021062440 | A | 4/2021 |
| JP | 2021142593 | A | 9/2021 |

* cited by examiner

SHEET PROCESSING APPARATUS AND IMAGE FORMING SYSTEM

BACKGROUND OF THE INVENTION

Field of the Invention

The present invention relates to a sheet processing apparatus for processing sheets and an image forming system equipped with the same.

Description of the Related Art

Sheet processing apparatuses for performing processes such as binding processes or sorting processes to sheets having images formed thereon in an image forming apparatus body are adopted as optional devices for image forming apparatuses such as electrophotographic multifunction apparatuses.

Hitherto, a sheet postprocessing apparatus configured to move a punching portion corresponding to sheet size by detecting a side edge portion of the sheet using a lateral registration detection sensor has been proposed (refer to Japanese Patent Application Laid-Open Publication No. H10-279170). Further, a sheet processing apparatus capable of detecting a side edge of a sheet using a line sensor and moving a punching unit in a width direction according to a detection result of the line sensor has been proposed (refer to Japanese Patent Application Laid-Open Publication No. 2021-62440).

The lateral registration detection sensor disclosed in Japanese Patent Application Laid-Open Publication No. H10-279170 and the line sensor disclosed in Japanese Patent Application Laid-Open Publication No. 2021-62440 are both an optical sensor that receives light by a light receiving portion. When paper dust discharged from conveyed sheets deposits on the optical sensor, the optical sensor may not be able to detect the side edge portion of the sheet correctly. Therefore, positional accuracy of the punching portion or the punching unit that moves in the width direction according to the detection result of the optical sensor may be deteriorated, and the positional accuracy of the holes punched on the sheets may also be deteriorated.

SUMMARY OF THE INVENTION

According to an aspect of the present invention, a sheet processing apparatus includes a conveyance unit configured to convey a sheet in a sheet conveyance direction, a punching unit configured to punch a hole to the sheet being conveyed by the conveyance unit, a moving unit configured to move the punching unit in an intersecting direction intersecting the sheet conveyance direction, a detection unit arranged upstream of the punching unit in the sheet conveyance direction and configured to change an output value based on a position of an edge portion, in the intersecting direction, of the sheet being conveyed, a cleaning portion configured to clean the detection unit, and an interlocking portion configured to move the cleaning portion so as to clean the detection unit by interlocking with a movement of the punching unit in the intersecting direction.

Further features of the present invention will become apparent from the following description of exemplary embodiments with reference to the attached drawings.

DESCRIPTION OF THE EMBODIMENTS

Figure 1:
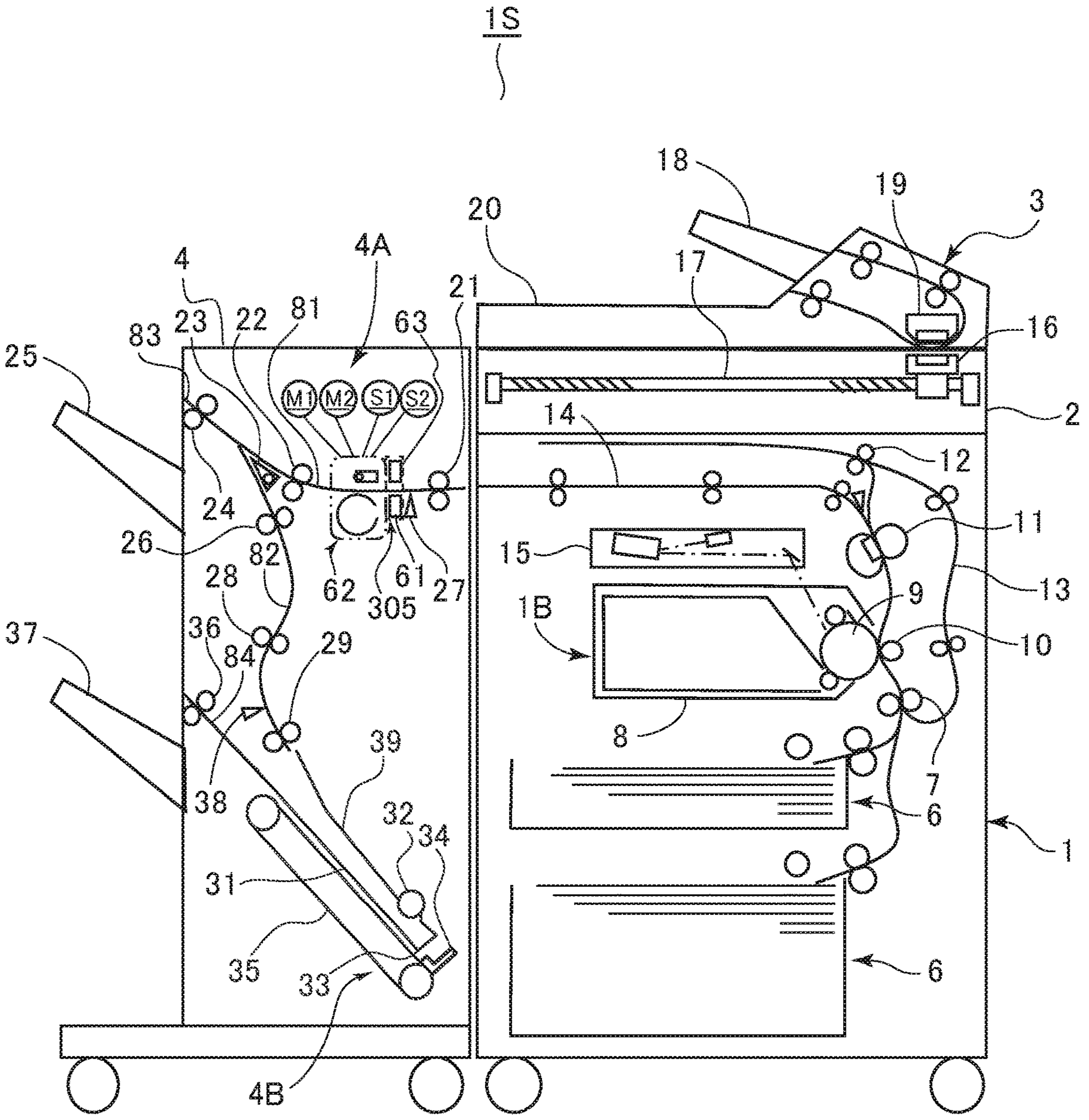
FIG. 1 is an entire schematic view illustrating an image forming system according to a first embodiment.

Explanatory embodiments for carrying out the present invention will be described below with reference to the drawings.

First Embodiment

Entire Configuration

An image forming system 1S according to a first embodiment is composed of an image forming apparatus 1, an image reading apparatus 2, a document feeding apparatus 3, and a postprocessing apparatus 4. The image forming system 1S forms an image on a sheet serving as a recording material, and subjects the sheet to processing in the postprocessing apparatus 4 according to need before outputting the same. Hereafter, the operations of respective apparatuses are described briefly, and thereafter, the postprocessing apparatus 4 will be described in detail.

The document feeding apparatus 3 conveys a document placed on a document tray 18 to image reading units 16 and 19. The image reading units 16 and 19 are each an image sensor that reads image information from a document surface, and both sides of a document are read in a single document conveyance. The document having its image information read is discharged to a document discharge portion 20. Further, by moving the image reading unit 16 in reciprocating motion by a driving device 17, the image reading apparatus 2 can read an image information from a still document set on a platen glass, including a document such as a booklet document that cannot be conveyed by the document feeding apparatus 3.

The image forming apparatus 1 is an electrophotographic apparatus equipped with a direct transfer-type image forming unit 1B. The image forming unit 1B includes a cartridge 8 equipped with a photosensitive drum 9, and a laser scanner unit 15 arranged above the cartridge 8. When performing an image forming operation, a surface of the photosensitive drum 9 in rotation is charged, and an electrostatic latent image is formed on the drum surface by the laser scanner unit 15 exposing the photosensitive drum 9 based on the image information. The electrostatic latent image borne on the photosensitive drum 9 is developed into a toner image by charged toner particles, and the toner image is conveyed to a transfer portion where the photosensitive drum 9 and a transfer roller 10 oppose one another. A control unit of the image forming apparatus 1 executes the image forming operation by the image forming unit 1B based on the image information read by the image reading units 16 and 19 or the image information received from an external computer via a network.

The image forming apparatus 1 includes a plurality of sheet feeding apparatuses 6 that feed sheets serving as recording materials one at a time. The sheet fed from the sheet feeding apparatus 6 is subjected to skew correction at a registration roller 7, and then transferred to the transfer portion where the toner image borne on the photosensitive drum 9 is transferred to the sheet. A fixing unit 11 is arranged downstream of the transfer portion in a sheet conveyance direction. The fixing unit 11 includes a rotary member pair that nips and conveys the sheet, and a heating element such as a halogen lamp that heats the toner image, and the toner image on the sheet is heated and pressed to fix the image.

When discharging the sheet on which an image has been formed to the exterior of the image forming apparatus 1, the sheet having passed through the fixing unit 11 is conveyed via a horizontal conveyance portion 14 to the postprocessing apparatus 4. In the case of a sheet to which image forming to the first surface has been completed in duplex printing, the sheet having passed through the fixing unit 11 is transferred to a reverse roller 12, subjected to switchback conveyance by the reverse roller 12, and is conveyed again to the registration roller 7 via a reconveyance portion 13. Then, the sheet passes through the transfer portion and the fixing unit 11 again where an image is formed on the second surface, before being conveyed to the postprocessing apparatus 4 via the horizontal conveyance portion 14.

The image forming unit 1B described above is one example of an image forming unit for forming an image on a sheet, and it is also possible to adopt an intermediate transfer-type electrophotographic unit in which a toner image formed on a photoreceptor is transferred to a sheet via an intermediate transfer body. Further, a printing unit adopting an inkjet system or an offset printing system can also be used as the image forming unit.

Postprocessing Apparatus

The postprocessing apparatus 4 serving as a sheet processing apparatus includes a punching process portion 4A for subjecting sheets to a punching process, and a binding process portion 4B for subjecting the sheets to a binding process, wherein the sheets received from the image forming apparatus 1 is subjected to the punching process and the binding process before the sheets are discharged as a sheet bundle. Further, the postprocessing apparatus 4 can simply discharge the sheets received from the image forming apparatus 1 without subjecting the sheets to the punching process or the binding process.

The postprocessing apparatus 4 is equipped with a reception path 81, an inner sheet discharge path 82, a first sheet discharge path 83, and a second sheet discharge path 84 that serve as a conveyance path for conveying sheets, and is further provided with an upper sheet discharge tray 25 and a lower sheet discharge tray 37 serving as a sheet discharge destination to which the sheets are discharged. The reception path 81 serving as a first conveyance path is a conveyance path through which the sheet received from the image forming apparatus 1 is conveyed, and the inner sheet discharge path 82 serving as a second conveyance path is a conveyance path that extends downward from the reception path 81 to guide the sheet toward the binding process portion 4B. The first sheet discharge path 83 is a conveyance path that discharges the sheet to the upper sheet discharge tray 25, and the second sheet discharge path 84 serving as a third conveyance path is a conveyance path that extends along the sheet discharge direction and through which the sheet is guided to the lower sheet discharge tray 37.

The sheet discharged from the horizontal conveyance portion 14 of the image forming apparatus 1 is received by an inlet roller 21 serving as a conveyance unit arranged on the reception path 81, and conveyed through the reception path 81 toward a pre-reverse roller 22. An inlet sensor 27 detects the sheet at a detection position between the inlet roller 21 and the pre-reverse roller 22. The pre-reverse roller 22 conveys the sheet received from the inlet roller 21 toward the first sheet discharge path 83.

At a predetermined timing after the inlet sensor 27 has detected the passing of a trailing edge of a sheet, the pre-reverse roller 22 is accelerated such that a conveyance speed of the sheet is raised to a speed faster than the conveyance speed at the horizontal conveyance portion 14. It is also possible to set the conveyance speed of the sheet by the inlet roller 21 to be greater than the speed at the horizontal conveyance portion 14 and accelerate the conveyance speed at the inlet roller 21 arranged upstream of the pre-reverse roller 22. In that case, it is preferable to install a one-way clutch between a conveyance roller of the horizontal conveyance portion 14 and a motor that drives the roller, such that the conveyance roller rotates idly when the sheet is pulled by the inlet roller 21.

If a discharge destination of the sheet is the upper sheet discharge tray 25, a reverse roller 24 discharges the sheet received from the pre-reverse roller 22 to the upper sheet discharge tray 25. In that case, the reverse roller 24 is decelerated to a predetermined sheet discharge speed at a predetermined timing after the trailing edge of the sheet has passed the pre-reverse roller 22.

If the discharge destination of the sheet is the lower sheet discharge tray 37, the reverse roller 24 serving as a reverse portion performs a switchback conveyance of reversing the sheet received from the pre-reverse roller 22 and conveys the sheet to the inner sheet discharge path 82. A check valve 23 is arranged at a branch portion where the reception path 81 and the inner sheet discharge path 82 are branched from the first sheet discharge path 83 upstream of the reverse roller 24 in the sheet discharge direction of the reverse roller 24. The check valve 23 has a function to restrict the sheet having been switched back by the reverse roller 24 from being conveyed back to the reception path 81. The pre-reverse roller 22 starts to rotate in the reverse direction at a timing at which the trailing edge of the sheet passes through the check valve 23.

An inner sheet discharge roller 26, an intermediate conveyance roller 28, and a kick-out roller 29 serving as rotary member pairs arranged on the inner sheet discharge path 82 convey the sheets received from the reverse roller 24 sequentially toward the binding process portion 4B. When performing buffering of sheets, the inner sheet discharge roller 26 stops temporarily while nipping a preceding sheet. Then, the inner sheet discharge roller 26 rotates in the reverse direction in synchronization with a succeeding sheet moving toward the reverse roller 24, and buffers the sheets by superposing the preceding sheet to the succeeding sheet in a first sheet discharge path. Buffering of a plurality of sheets is made possible regardless of sheet lengths by repeating switchback of the inner sheet discharge roller 26.

A pre-intermediate stacking sensor 38 detects the sheet between the intermediate conveyance roller 28 and the kick-out roller 29. An optical sensor for detecting the presence or absence of a sheet at the detection position using light can be used as the inlet sensor 27 and the pre-intermediate stacking sensor 38, and passing of the leading edge or the trailing edge of the sheet or the presence or absence of a jammed sheet can be detected thereby.

The binding process portion 4B includes an intermediate lower guide 31, a longitudinal alignment roller 32, a longitudinal alignment reference plate 33, a bundle discharge guide 34, a guide driving unit 35, and a stapler and a width alignment mechanism which are not shown, serving as a supporting portion on which the sheets are supported. The sheets sent from the inner sheet discharge path 82 are stacked on the intermediate lower guide 31 and abutted against the longitudinal alignment reference plate 33 by the longitudinal alignment roller 32. Thereby, alignment of sheets in the sheet conveyance direction is performed.

Next, the sheets are aligned in a width direction orthogonal to the sheet conveyance direction by a width alignment mechanism not shown and bound by a stapler not shown. The sheet bundle bound by the stapler is pushed out by the bundle discharge guide 34 driven by the guide driving unit 35, and transferred via the second sheet discharge path 84 to a bundle discharge roller 36. Then, the sheet bundle is discharged to the exterior of the apparatus by the bundle discharge roller 36 serving as a discharge portion and stacked on the lower sheet discharge tray 37.

The upper sheet discharge tray 25 and the lower sheet discharge tray 37 are both capable of moving up and down with respect to a casing of the postprocessing apparatus 4. The postprocessing apparatus 4 is equipped with a sheet surface detection sensor for detecting an upper surface position of the sheet on the upper sheet discharge tray 25 and the lower sheet discharge tray 37, and when either one of the sensors detects a sheet, the corresponding tray is lowered. If the sheet surface detection sensor detects that the sheet on the upper sheet discharge tray 25 or the lower sheet discharge tray 37 has been removed, the corresponding tray is lifted. Therefore, the upper sheet discharge tray 25 and the lower sheet discharge tray 37 are controlled to be lifted and lowered such that an upper surface of the stacked sheet is maintained at a fixed level.

Punching Process Portion

Figure 2A:
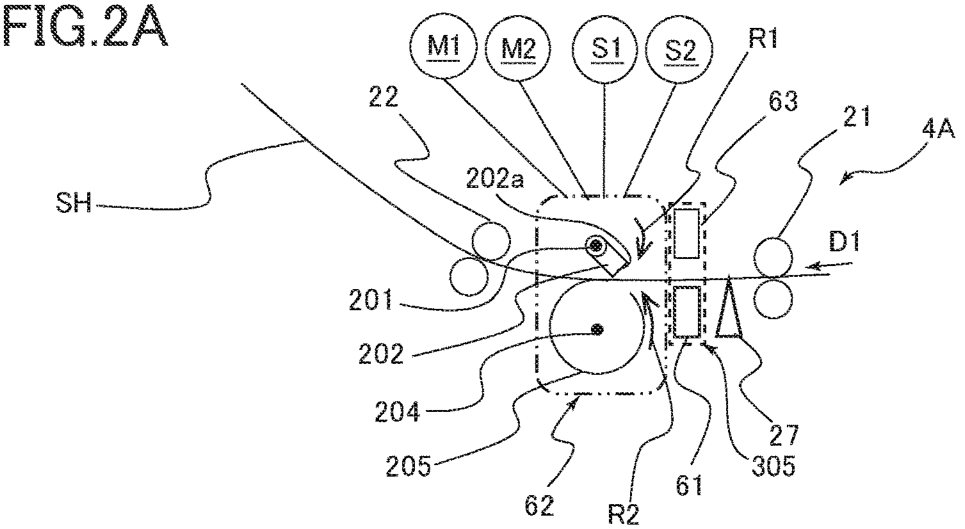
FIG. 2A is a schematic diagram illustrating a punch positioned at a punching start position.
Figure 2B:
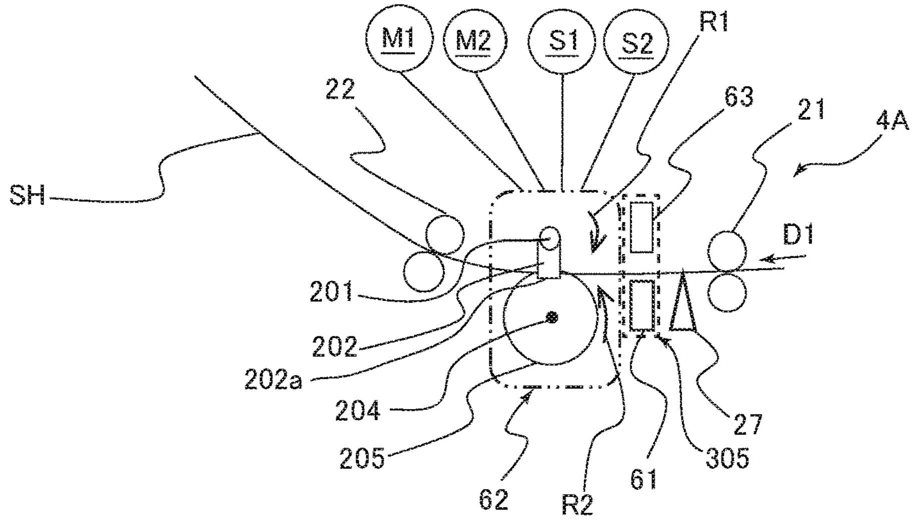
FIG. 2B is a schematic diagram illustrating a punch positioned at a punching completion position.
Figure 2C:
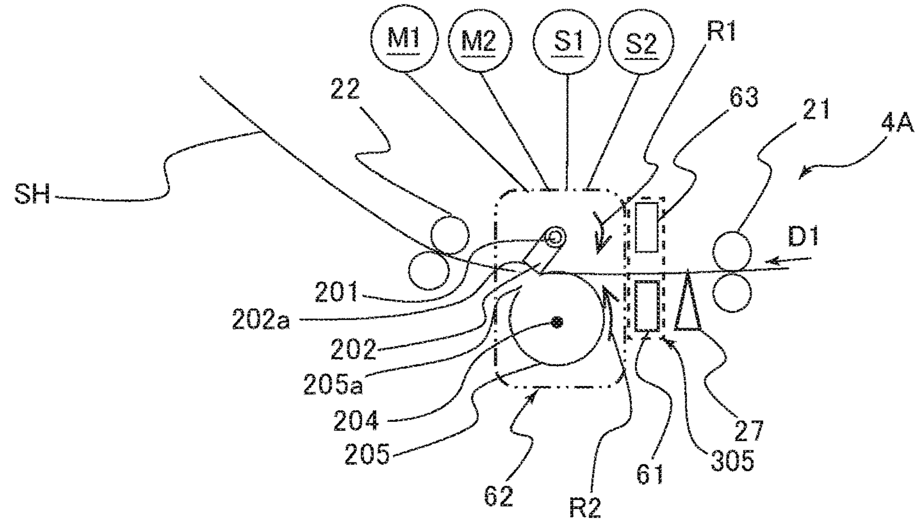
FIG. 2C is a schematic diagram illustrating a punch positioned at a separation position.

Next, the punching process portion 4A will be described in detail. The punching process portion 4A includes, as illustrated in FIGS. 2A to 2C, the inlet roller 21 for conveying a sheet SH in a sheet conveyance direction D1, the inlet sensor 27, a side edge detection unit 305, a punching unit 62, and a shift unit not shown. The side edge detection unit 305 includes a lighting unit 63 and a line sensor 61, wherein the lighting unit 63 and the line sensor 61 are arranged to oppose one another with the reception path 81 (refer to FIG. 1) interposed therebetween. The side edge detection unit 305 is arranged upstream of the punching unit 62 in the sheet conveyance direction D1. The inlet sensor 27 is arranged upstream of the side edge detection unit 305 in the sheet conveyance direction D1, and output signals are changed when a leading edge 506 (refer to FIG. 5A) which is a downstream edge of the sheet in the sheet conveyance direction D1 passes through.

The line sensor 61 serving as a detection unit extends in a width direction of the sheet SH orthogonal to the sheet conveyance direction D1, and output signals serving as output values are changed based on a position of an edge portion of the sheet SH in the width direction. More specifically, the line sensor 61 is composed of an optical sensor, and the output value thereof is changed based on a boundary position of density difference on the line sensor 61 that appears by the light irradiated from the lighting unit 63 being blocked by the sheet SH. Thereby, the side edge position which is the edge portion of the sheet SH in the width direction can be detected.

The punching unit 62 is a rotary punching unit including a punch 202 that rotates in an R1 direction about a shaft center 201 serving as an axis, and a die 205 that rotates in an R2 direction opposite to the R1 direction about a shaft center 204. Gears not shown having the same number of teeth are provided on the shaft centers 201 and 204, and the gears are meshed with one another. More specifically, drive from a punch motor M1 is entered to the gear provided on the shaft center 204 of the die 205, and the gear is meshed with a gear provided on the shaft center 201 of the punch 202.

Thereby, the punch 202 and the die 205 are rotated synchronously by the punch motor M1 such that a blade edge 202*a* of the punch 202 and a hole portion 205*a* of the die 205 engage with each other. The punch motor M1 is configured to provide drive such that a circumferential speed of the blade edge 202*a* of the punch 202 becomes the same as a speed of the sheet SH in the sheet conveyance direction D1, to enable punching to be performed while conveying the sheet SH. The punch motor M1 is composed of a stepping motor, but it can also be composed of a motor adopting other driving methods, such as a DC brushless motor.

FIG. 2A is a schematic diagram illustrating a state in which the punch 202 is positioned at a punching start position. FIG. 2B is a schematic diagram illustrating a state in which the punch 202 is positioned at a punching completion position. FIG. 2C is a schematic diagram illustrating a state in which the punch 202 is positioned at a separation position. The punch 202 rotating in the R1 direction starts to contact the sheet SH at the punching start position illustrated in FIG. 2A, and engages with the die 205 at the punching completion position illustrated in FIG. 2B. Then, the punch 202 separates from the sheet SH at the separation position illustrated in FIG. 2C. By rotating the punch 202 at a predetermined timing after a leading edge of the sheet SH has been detected by the inlet sensor 27, punching can be performed with various hole pitches to the sheet SH during conveyance.

A rotational position of the punch 202 is detected by a punch position sensor S1. The punching unit 62 is provided with a shielding plate not shown that rotates integrally with the punch 202, and the punch position sensor S1 changes the output signal depending on whether the optical path is shielded by the shielding plate or the optical path is opened. For example, in the present embodiment, while the punch 202 is positioned between the punching start position and the separation position in the R1 direction, the optical path of the punch position sensor S1 is shielded by the shielding plate having a fan shape. That is, when the punch 202 is positioned at the punching start position, the optical path of the punch position sensor S1 starts to be blocked by the shielding plate, and when the punch 202 reaches the separation position, the optical path of the punch position sensor S1 starts to be opened.

The rotational position of the punch 202 is controlled by both the detection of the rotational position by the punch position sensor S1 and pulses from the punch motor M1 composed of the stepping motor. In the present embodiment, the punch 202 is configured to stand by at a home position upstream of the punching start position in the R1 direction.

Figure 7A:
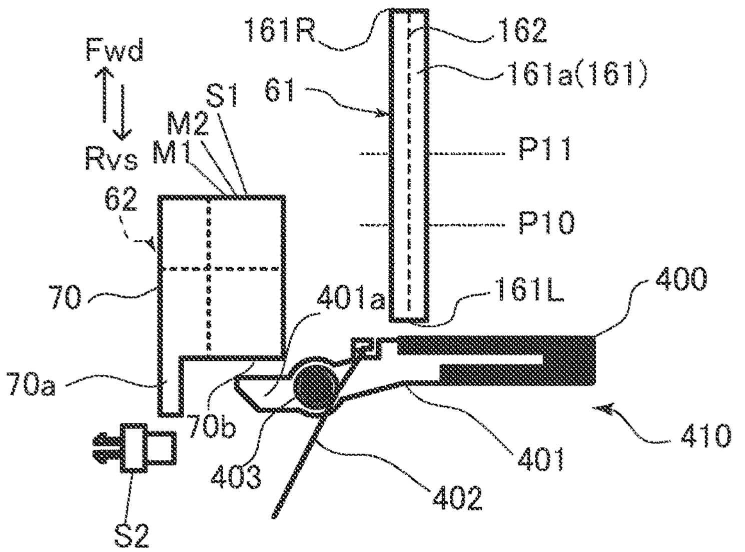
FIG. 7A is a plan view illustrating a cleaning unit.

Further, a shift unit (not shown) for shifting the punching unit 62 in a width direction W (refer to FIG. 5A) orthogonal to the sheet conveyance direction D1 is provided on the punching process portion 4A. According to the present embodiment, the width direction W serving as an intersecting direction is a direction orthogonal to the sheet conveyance direction D1, but it can be any direction as long as the direction intersects the sheet conveyance direction D1. The shift unit includes, as illustrated in FIG. 7A, a punch base 70 that retains the punching unit 62 and serving as a moving unit that is movable in the width direction W together with the punching unit 62, and a feed screw mechanism not shown for moving the punch base 70 in the width direction W. The feed screw mechanism is driven by a shift motor M2. Further, it is also possible to move the punch base 70 in the width direction W by a gear train or a belt being driven by the shift motor M2, instead of the feed screw mechanism.

The punching unit 62 and the punch base 70 move in a forward (Fwd) direction by rotating the shift motor M2 in a normal direction, and move in a reverse (Rvs) direction opposite to the forward direction by rotating the shift motor M2 in a reverse direction. The forward and reverse directions are directions parallel to the width direction W. The punching unit 62 moves from the home position in the width direction to the forward direction to thereby approach the center in the width direction W of the conveyance path, i.e., the reception path 81. Further, the punching unit 62 moves from the home position in the width direction to the reverse direction to thereby move away from the center in the width direction W of the conveyance path, i.e., the reception path 81. The shift motor M2 is composed of a pulse motor, and the position of the punching unit 62 in the width direction W is managed by the number of pulses entered to the shift motor M2 with the home position in the width direction set as the reference.

Control System

Figure 3:
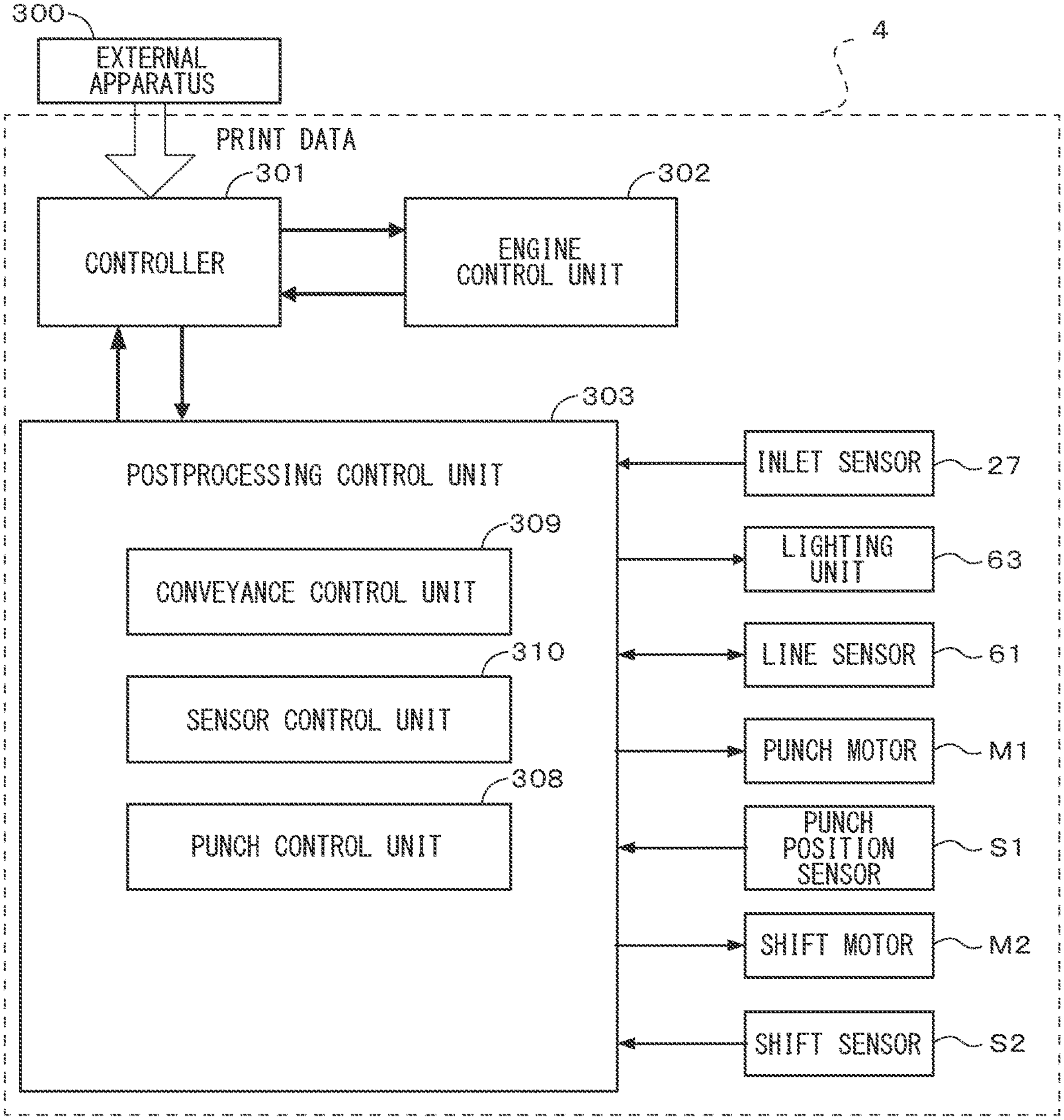
FIG. 3 is a block diagram illustrating a functional block of a postprocessing apparatus.
Figure 4:
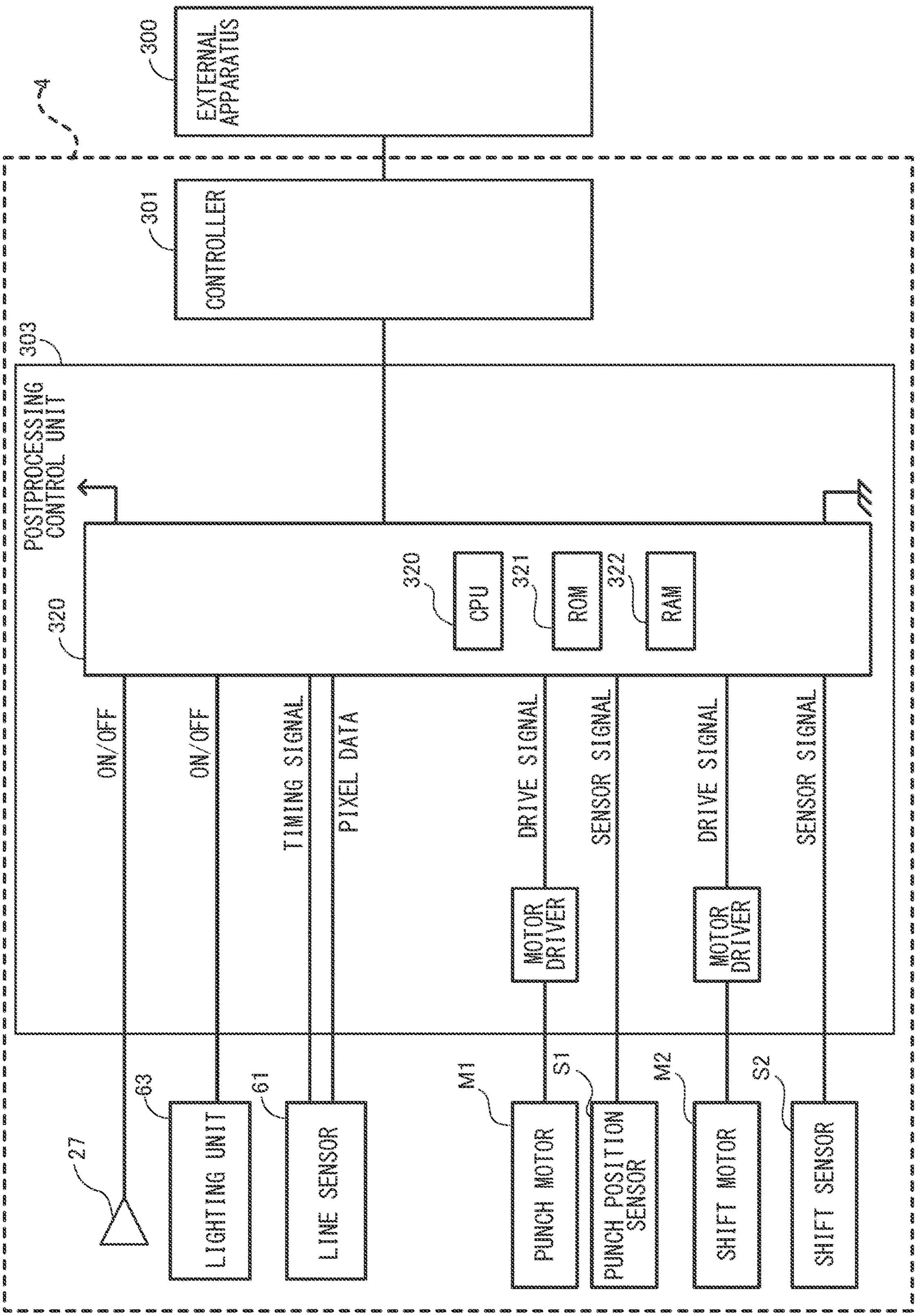
FIG. 4 is a block diagram illustrating a hardware configuration of the postprocessing apparatus.

Next, a control system of the postprocessing apparatus 4 according to the present embodiment will be described. FIG. 3 is a block diagram illustrating a functional block of the postprocessing apparatus 4, and FIG. 4 is a block diagram illustrating a hardware configuration of the postprocessing apparatus 4. As illustrated in FIGS. 3 and 4, the postprocessing apparatus 4 includes a controller 301, an engine control unit 302, and a postprocessing control unit 303, wherein the postprocessing control unit 303 includes functional blocks such as a conveyance control unit 309, a sensor control unit 310, and a punch control unit 308.

The conveyance control unit 309 controls the conveyance of the sheet SH, and the sensor control unit 310 detects a side edge 507 (refer to FIG. 5B) serving as an edge portion of the sheet SH in the width direction W. The punch control unit 308 controls the punching unit 62 such that punching is performed to a desired position on the sheet SH.

Further, the postprocessing control unit 303 includes a hardware configuration such as a CPU 320, a ROM 321, and a RAM 322. The CPU 320 reads various programs stored in the ROM 321 and performs calculation. The RAM 322 is used as a work area of the CPU 320.

The image transmitted from an external apparatus 300 such as a server or a computer is expanded and adjusted by the controller 301, and the controller 301 instructs the engine control unit 302 to perform the image forming operation. Whether to perform punching of the sheet SH is instructed through a touch panel not shown attached to the image forming apparatus 1, the image reading apparatus 2, or the document feeding apparatus 3, or by the external apparatus 300, which is sent to the postprocessing control unit 303 via the controller 301.

The inlet sensor 27, the lighting unit 63, the line sensor 61, the punch motor M1, the punch position sensor S1, the shift motor M2, and a shift sensor S2 are connected to the postprocessing control unit 303. An ON signal or an OFF signal is output from the inlet sensor 27 to the postprocessing control unit 303. An ON signal or an OFF signal is output from the postprocessing control unit 303 to the lighting unit 63. A timing signal notifying a timing to start detection by the line sensor 61 is output from the postprocessing control unit 303 to the line sensor 61, and image data is output from the line sensor 61 to the postprocessing control unit 303.

A driving signal is output from the postprocessing control unit 303 to the punch motor M1 via a motor driver. Similarly, a driving signal is output from the postprocessing control unit 303 to the shift motor M2 via a motor driver. A sensor signal composed of an ON signal, which is a high voltage signal, or an OFF signal, which is a low voltage signal, is output from the punch position sensor S1 to the postprocessing control unit 303. When the optical path of the punch position sensor S1 is shielded by the shielding plate mentioned above, an ON signal is output from the punch position sensor S1. When the optical path is opened, an OFF signal is output from the punch position sensor S1.

Figure 7B:
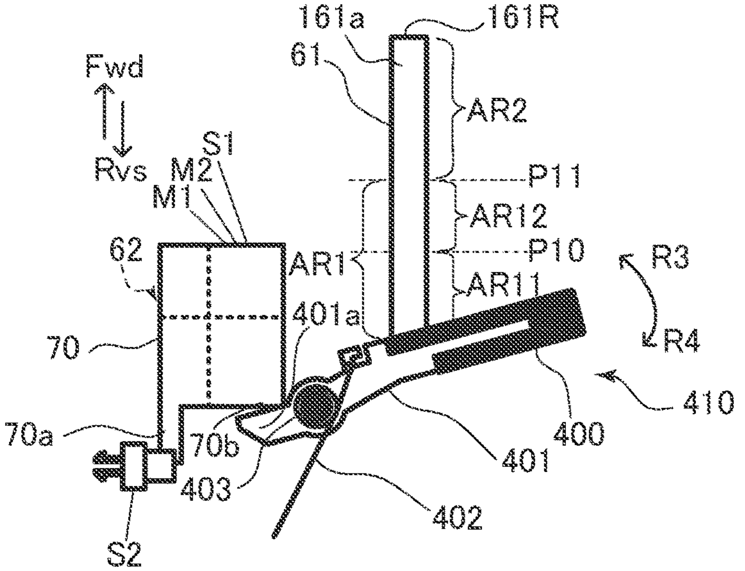
FIG. 7B is a plan view illustrating a state in which a punch base has been abutted against an arm.
Figure 7C:
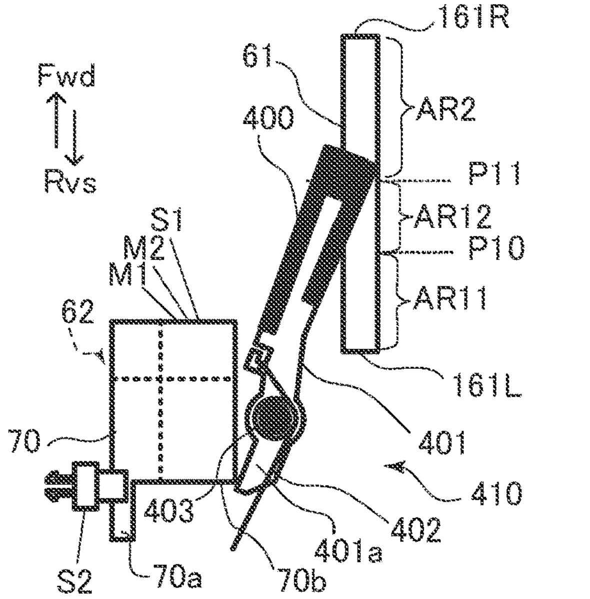
FIG. 7C is a plan view illustrating a state in which a nonwoven fabric has moved to a cleaning completion position.

Similarly, a sensor signal composed of an ON signal or an OFF signal is output from the shift sensor S2 to the postprocessing control unit 303. As illustrated in FIGS. 7A to 7C, a light shielding portion 70*a* is provided on the punch base 70. When the optical path of the shift motor M2 composed of the optical sensor is shielded by the light shielding portion 70*a*, an ON signal is output from the shift sensor S2, and when the optical path is opened, an OFF signal is output from the shift sensor S2. That is, the shift sensor S2 serving as a movement detection unit varies the signals serving as the output value based on the position of the punch base 70.

Punching Operation

Next, a punching operation performed to the sheet SH will be explained. In the present embodiment, a case in which a two-hole punch mode of punching two holes to each sheet SH is illustrated as an example, especially with the sheet SH skewed. In FIGS. 5A to 5D and FIGS. 6A to 6D, reference number 250 denotes a center of the punch 202 in a punching completion position, hereinafter referred to as a punch center 250. Further, target positions P1 and P2 illustrated on the sheet SH are target positions of holes to be punched by the punch 202, which are indicated in dashed lines. When holes are punched to the target positions P1 and P2, holes P1' and P2' are indicated in solid lines. The target position P1 is positioned downstream of the target position P2 in the sheet conveyance direction D1, and it shows a position of the hole to be punched first on the sheet SH. The target position P2 is a position of the hole to be punched second on the sheet SH.

Figure 5A:
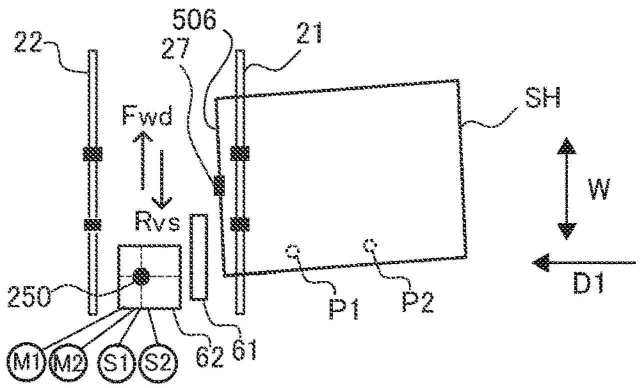
FIG. 5A is a plan view illustrating a state in which a leading edge of a sheet has reached an inlet sensor.

When a punching operation of punching holes P1' and P2' to the sheet SH is started, as shown in FIG. 5A, the leading edge 506 of the sheet SH conveyed by the inlet roller 21 is detected by the inlet sensor 27, and the signal of the inlet sensor 27 is switched. In this stage, holes P1' and P2' on the sheet SH are not yet punched, such that they are indicated by dashed lines. At this time, the conveyance control unit 309 of the postprocessing control unit 303 detects the reaching of the sheet SH to a punch area, and instructs preparation of edge portion detection of the sheet SH to the sensor control unit 310 and instructs preparation of punching operation to the punch control unit 308.

Figure 5B:
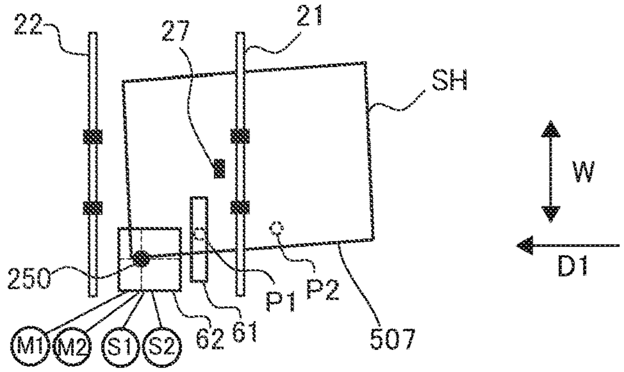
FIG. 5B is a plan view illustrating a state in which a target position of a hole has reached a line sensor.

When the sheet SH is conveyed further by the inlet roller 21, as illustrated in FIG. 5B, the target position P1 reaches the line sensor 61. By detecting a density difference at a boundary of the area covered by the sheet SH and the area not covered by the sheet SH, the line sensor 61 detects the position of the side edge 507 in the width direction W of the sheet SH positioned at a position where the target position P1 and the line sensor 61 overlap in the sheet conveyance direction D1.

The postprocessing control unit 303 determines that the target position P1 has reached the line sensor 61 after a predetermined time has elapsed from the detection of the leading edge 506 of the sheet SH by the inlet sensor 27. The predetermined time is set according to the target position of the hole set in advance. Further, in a case where the sheet SH is skewed, the detection timing of the leading edge 506 is slightly varied compared to the case where the sheet SH is not skewed, but the error of output value of the line sensor 61 based on the difference of detection timing is so small that it can be ignored.

The postprocessing control unit 303 calculates a first movement distance of the punching unit 62 based on the position of the punch center 250 of the punching unit 62 managed by the shift sensor S2 and the shift motor M2 and the position of the side edge 507 detected by the line sensor 61. The first movement distance is a difference of position in the width direction W between the punch center 250 and the position of the side edge 507 detected in FIG. 5B.

Figure 5C:
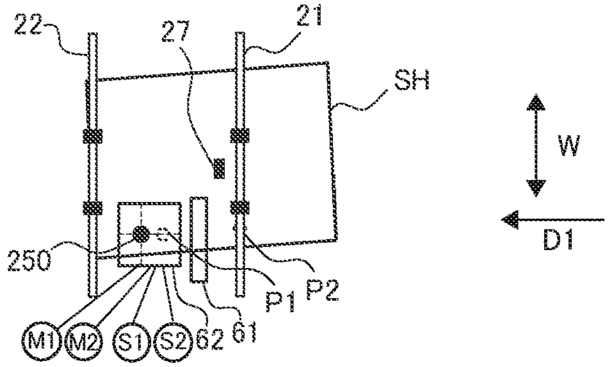
FIG. 5C is a plan view illustrating a state in which a sheet has been moved in a width direction.

Next, the postprocessing control unit 303 drives the shift motor M2 to move the punching unit 62 for a first movement distance in the width direction W, as illustrated in FIG. 5C, such that the punch center 250 and the target position P1 are aligned in the width direction W. The movement of the punching unit 62 in the width direction W is completed before the target position P1 reaches the punch center 250 and before the blade edge 202*a* (refer to FIG. 2A) of the punch 202 rotated by the punch motor M1 contacts the sheet SH.

Figure 5D:
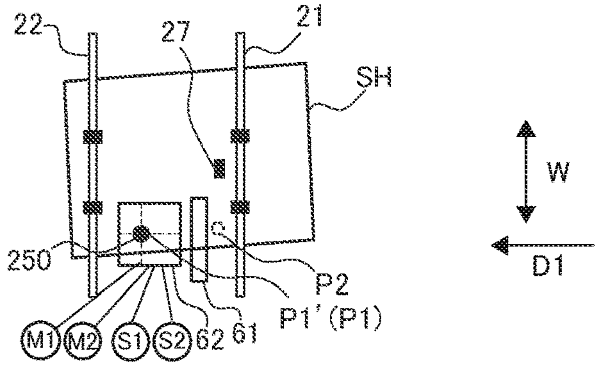
FIG. 5D is a plan view illustrating a state in which a hole has been punched to the sheet.

FIG. 5D is a plan view illustrating a state in which the punch center 250 corresponds to the target position P1 and a hole P1' has been punched by the punch 202. In this state, the punch 202 is positioned at the punching completion position, and the punch 202 is driven by the punching motor M1 in correspondence with this timing.

Figure 6A:
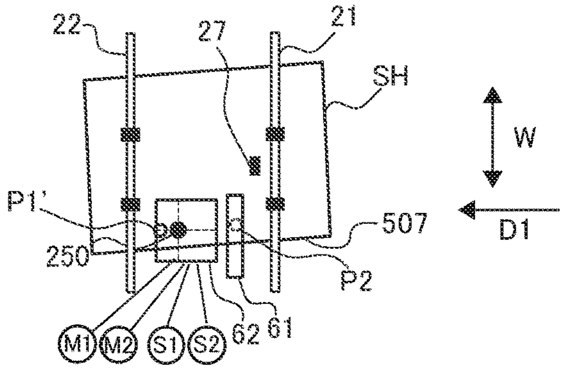
FIG. 6A is a plan view illustrating a state in which a target position of a second hole has reached the line sensor.

If the sheet SH is conveyed further by the inlet roller 21, as illustrated in FIG. 6A, the target position P2 reaches the line sensor 61. The line sensor 61 detects the position of the side edge 507 in the width direction W of the sheet SH positioned at a position in which the target position P2 and the line sensor 61 overlap in the sheet conveyance direction D1 by detecting the density difference at the boundary between the area covered by the sheet SH and the area not covered by the sheet SH.

Then, the postprocessing control unit 303 calculates a second movement distance of the punching unit 62 based on the punch center 250 of the punching unit 62 and a position of the side edge 507 detected by the line sensor 61. The second movement distance is a difference between the punch center 250 and the position of the side edge 507 detected in FIG. 6A in the width direction W.

Figure 6B:
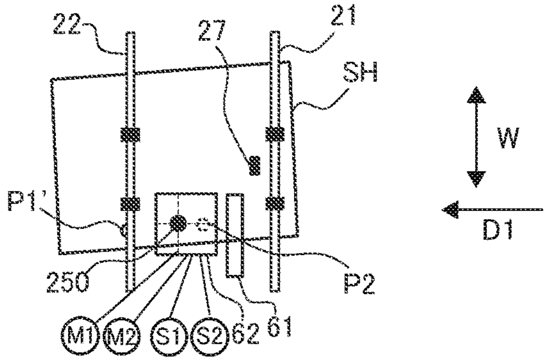
FIG. 6B is a plan view illustrating a state in which the sheet has been moved in the width direction.

Next, the postprocessing control unit 303 drives the shift motor M2 to move the punching unit 62 for a second movement distance in the width direction W, as illustrated in FIG. 6B, such that the punch center 250 and the target position P2 are aligned in the width direction W. The movement of the punching unit 62 in the width direction W is completed before the target position P1 reaches the punch center 250 and before the blade edge 202*a* (refer to FIG. 2A) of the punch 202 rotated by the punch motor M1 contacts the sheet SH.

Figure 6C:
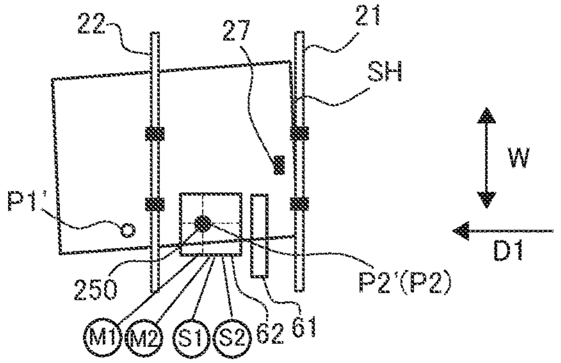
FIG. 6C is a plan view illustrating a state in which the sheet has been punched.

FIG. 6C is a plan view illustrating a state in which the punch center 250 corresponds to the target position P2 and a hole P2' has been punched by the punch 202. In this state, the punch 202 is positioned at the punching completion position, and the punch 202 is driven by the punch motor M1 in correspondence with this timing.

Figure 6D:
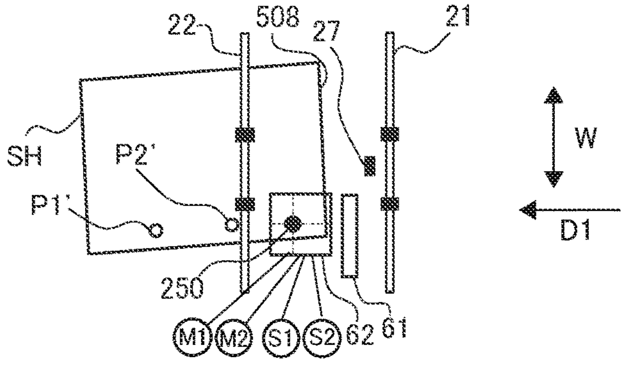
FIG. 6D is a plan view illustrating a state in which a trailing edge of the sheet has passed the line sensor.

FIG. 6D is a plan view illustrating a state after a trailing edge 508 of the sheet SH has passed the line sensor 61. The holes P1' and P2 are punched as targeted on the target positions P1 and P2 of the sheet SH. In FIG. 6D, the shift motor M2 is not driven after punching a hole to the target position P2, but the shift motor M2 can be driven such that the punching unit 62 is returned to the home position in the width direction (refer to FIG. 5A) to prepare for the arrival of the subsequent sheet to the punch area.

As described, by detecting the position of the side edge 507 of the sheet SH by the line sensor 61 for each of the target positions P1 and P2, the position of the punching unit 62 in the width direction W can be adjusted highly accurately and holes can be punched as targeted on the target positions P1 and P2. The abovementioned operation is repeated if there are three or more holes to be punched on the sheet SH.

Cleaning Unit

Next, a cleaning unit 410 for cleaning the line sensor 61 will be described with reference to FIGS. 7A to 7C. As illustrated in FIG. 7A, the line sensor 61 includes a transparent member 161 having a detection surface 161*a* opposed to a surface of the sheet conveyed by the inlet roller 21 (refer to FIG. 1), and a plurality of light receiving elements 162 that are arranged in the width direction W to receive light having passed through the transparent member 161. A Contact Image Sensor (CIS), a Charge Coupled Device (CCD) sensor, or a Complementary Metal Oxide Semiconductor (CMOS) sensor can be used, for example, as the line sensor 61.

The cleaning unit 410 includes an arm 401 that pivots about a pivot shaft 403, a nonwoven fabric 400 supported by a first end portion of the arm 401, and a coil spring 402 urging the arm 401. A contact portion 401*a* against which the punch base 70 abuts is provided on a second end portion of the arm 401. The second end portion of the arm 401 is positioned on an opposite side interposing the pivot shaft 403 from the first end portion on which the nonwoven fabric 400 is attached. The arm 401 is urged by the coil spring 402 in an R4 direction illustrated in FIG. 7B about the pivot shaft 403, and is positioned at a standby position illustrated in FIG. 7A by being abutted against a stopper not shown.

The punch base 70 retaining the punching unit 62 includes the light shielding portion 70a extending in the width direction W and a pressing portion 70b capable of pressing the contact portion 401a of the arm 401. As illustrated in FIG. 7A, in a state where the punching unit 62 and the punch base 70 are positioned at the home position in the width direction and the arm 401 of the cleaning unit 410 is positioned at the standby position, the pressing portion 70b is separated from the contact portion 401a.

When the punching unit 62 and the punch base 70 move in a reverse direction by the shift motor M2 rotating in the reverse direction, as illustrated in FIG. 7B, the pressing portion 70b of the punch base 70 presses the contact portion 401a of the arm 401. Thereby, the arm 401 pivots in an R3 direction about the pivot shaft 403 against an urging force of the coil spring 402. In FIG. 7B, the shift sensor S2 has its optical path shielded by the light shielding portion 70a, and the output signal is changed from OFF to ON. In this state, the nonwoven fabric 400 attached to the arm 401 starts to abut against the detection surface 161a of the transparent member 161 of the line sensor 61.

Then, when the punching unit 62 and the punch base 70 move further toward the reverse direction, as illustrated in FIG. 7C, the arm 401 pivots further in the R3 direction. Thereby, the nonwoven fabric 400 is rubbed against the detection surface 161a to thereby clean the paper dust as deposit deposited on the detection surface 161a. As described, the arm 401 serving as an interlocking portion and a pivot member moves the nonwoven fabric 400 serving as a cleaning portion by interlocking with the movement of the punching unit 62 in the width direction W. Paper dust is discharged from the sheets SH being conveyed. The deposits deposited on the detection surface 161a are not limited to paper dust, and it can be a filler added to the sheets SH or other types of dust.

The detection surface 161a can be divided into an area AR1 and an area AR2, and the area AR1 can be further divided into an area AR11 and an area AR12. The area AR1 is an area from a left edge portion 161L of the detection surface 161a to a position P11, wherein the position P11 is a position where a side edge portion, or left edge portion, of a minimum size sheet to which the punching unit 62 can punch holes passes. The area AR2 is an area from the position P11 to a right edge portion 161R of the detection surface 161a. The area AR11 is an area from the left edge portion 161L to a position P10, wherein the position P10 is a position where a side edge portion, or left edge portion, of a maximum size sheet to which the punching unit 62 can punch holes passes. The area AR12 serving as a predetermined area is an area from the position P11 to the position P11.

The postprocessing apparatus 4 according to the present embodiment can punch holes to sheets of various sizes, such that a position of the side edge portion, or left edge portion, of the sheet passing above the line sensor 61 differs according to the sheet size. The paper dust discharged from the sheets tends to deposit on the area through which the sheets pass through the detection surface 161a, that is, in the areas AR12 and AR2. However, since the area AR2 is the area through which the sheet passes regardless of the size of the sheet, such that paper dust deposited on the area AR2 will be removed by the sheet itself when the sheet passes above the line sensor 61. Therefore, the nonwoven fabric 400 should preferably be designed to clean at least the area AR12, and in the present embodiment, it is configured to clean the area AR1 including the area AR11 and the area AR12. Meanwhile the nonwoven fabric 400 will not clean the area AR2 due to the reason described above.

If it is determined that cleaning of the line sensor 61 is required, the punch control unit 308 (refer to FIG. 3) rotates the shift motor M2 in the reverse direction to swing the nonwoven fabric 400 from the position illustrated in FIG. 7A to the position illustrated in FIG. 7C, and thereafter rotates the shift motor M2 in the normal direction. Thereby, the punching unit 62 and the punch base 70 are returned to the home position in the width direction illustrated in FIG. 7A, and the arm 401 pivots in the R4 direction by the urging force of the coil spring 402. Thus, the nonwoven fabric 400 returns to the position illustrated in FIG. 7A.

Cleaning Control

Next, cleaning control by the cleaning unit 410 is described in further detail with reference to the flowchart of FIG. 8. The punching unit 62 is defined to be positioned at a punch position correction area when the shift sensor S2 is OFF, and the punching unit 62 is defined to be positioned at a sensor cleaning area when the shift sensor S2 is ON. The punch position correction area is an area in which the punching unit 62 moves in the width direction W during punching, and the sensor cleaning area is an area adjacent to the punch position correction area in the width direction W and in which the punching unit 62 moves in the width direction W during cleaning of the line sensor 61.

When cleaning control is started, the postprocessing control unit 303 starts to initialize the postprocessing apparatus 4 (step S601). The cleaning control is started, for example, by the power of the postprocessing apparatus 4 being turned on, and initialization of the postprocessing apparatus 4 includes cleaning of the line sensor 61 and the movement of the punching unit 62 in the home position in the rotational direction, for example.

Next, the postprocessing control unit 303 confirms whether there is a residual paper remaining in the postprocessing apparatus 4 (step S602), and determines whether there is a residual paper (step S603). If there is a residual paper (Step S603: Yes), the postprocessing control unit 303 displays a notification that there is a residual paper on the touch panel, for example (step S604), and ends the processing.

If there is no residual paper (step S603: No), the cleaning control by the cleaning unit 410 is continued, and a search for the width direction home position of the punching unit 62 is started (step S605). That is, the postprocessing control unit 303 determines whether the shift sensor S2 is ON (step S606). If the shift sensor S2 is ON (step S606: Yes), the postprocessing control unit 303 starts to rotate the shift motor M2 in the normal direction (step S607), and determines whether the shift sensor S2 has turned OFF (step S608). If the shift sensor S2 is still ON (step S608: No), the normal rotation of the shift motor M2 is continued.

When the shift sensor S2 is turned OFF in step S608, or when the shift sensor S2 is OFF from the beginning in step S606 (step S606: No), the procedure advances to step S609. In this state, the punching unit 62 is positioned within the punch position correction area since the search for the width direction home position has been completed.

Next, the postprocessing control unit 303 starts to rotate the shift motor M2 in the reverse direction, and the punching unit 62 is moved to the sensor cleaning area (step S609). Then, the postprocessing control unit 303 determines whether the shift sensor S2 is ON (step S610). If the shift sensor S2 is still OFF (step S610: No), the reverse rotation of the shift motor M2 is continued. In other words, the shift motor M2 serving as a drive source drives based on the output value of the shift sensor S2 and moves the punch base 70 in the width direction W.

When the shift sensor S2 is turned from OFF to ON (step S610: Yes), the postprocessing control unit 303 continues the reverse rotation of the shift motor M2 for an additional time T1 from when the shift sensor S2 has been turned ON. At a timing prior to the turning ON of the shift sensor S2, the pressing portion 70*b* of the punch base 70 starts pressing the contact portion 401*a* of the arm 401 of the cleaning unit 410. Thereby, the arm 401 pivots in the R3 direction, and the nonwoven fabric 400 moves to the cleaning completion position illustrated in FIG. 7C, by which the cleaning of the detection surface 161*a* of the line sensor 61 is completed. After elapse of time T1, the postprocessing control unit 303 stops the driving of the shift motor M2 (step S611).

Next, the postprocessing control unit 303 rotates the shift motor M2 in the normal direction again such that the punching unit 62 is moved to the width direction home position in the punch position correction area (step S612). Then, the postprocessing control unit 303 determines whether the shift sensor S2 has turned OFF (step S613). If the shift sensor S2 is still ON (step S613: No), the normal rotation of the shift motor M2 is continued.

When the shift sensor S2 is turned from ON to OFF (step S613: Yes), the postprocessing control unit 303 continues the normal rotation of the shift motor M2 for an additional time T2 before stopping the shift motor M2 (step S614). Thereby, the punching unit 62 stops at the width direction home position within the punch position correction area. As described, the cleaning control is ended.

Figure 8:
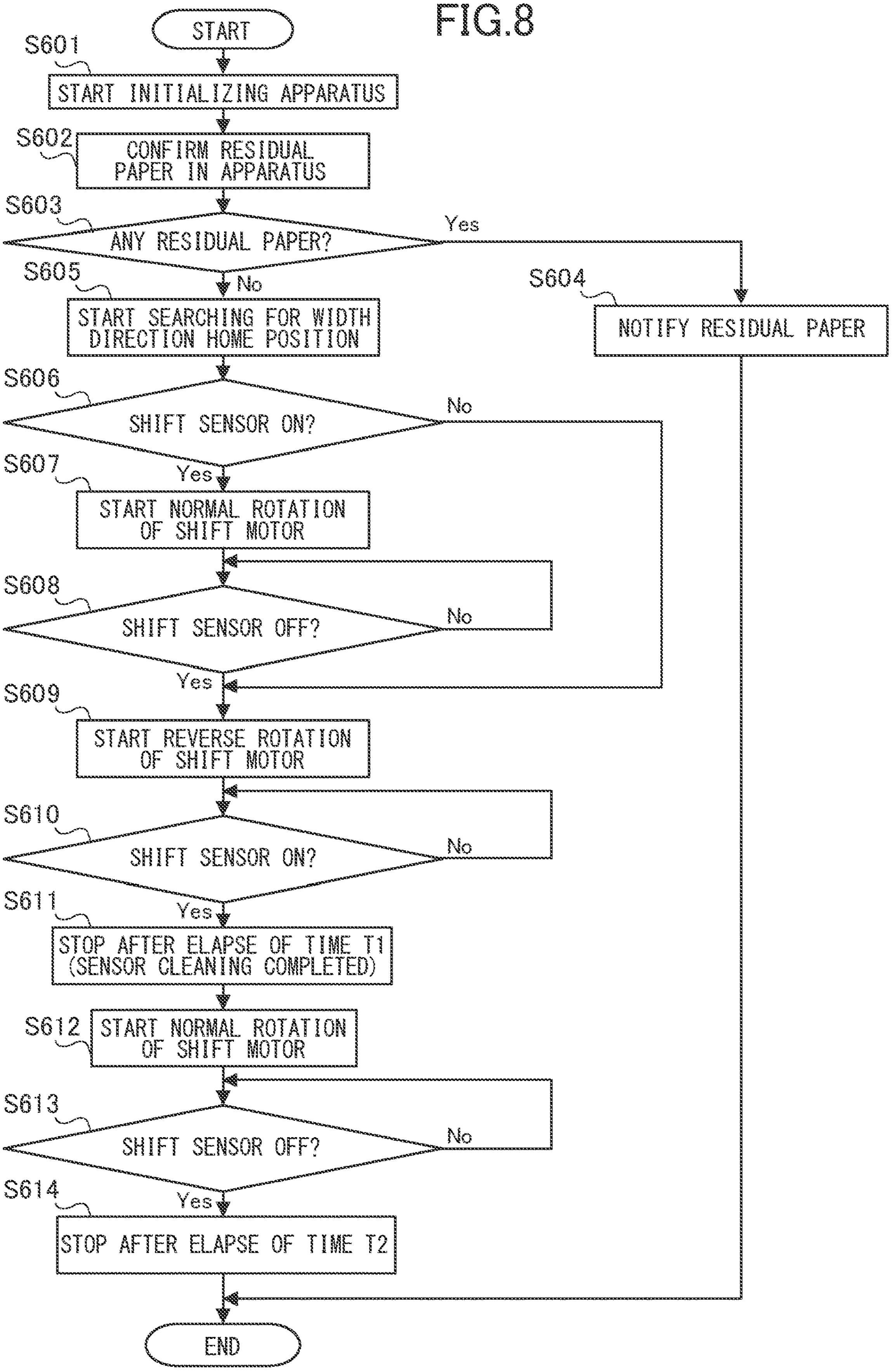
FIG. 8 is a flowchart illustrating a cleaning control.

In the flowchart illustrated in FIG. 8, cleaning control of the cleaning unit 410 has been described taking the turning on of power of the postprocessing apparatus 4 as an example, but the present technique is not limited thereto. For example, the processing of steps S605 to S614 can be performed at the timing when a job of punching holes to the sheets is started or when the job is completed. Further, it is also possible to count the number of sheets passing through the line sensor 61 and to clean the detection surface 161*a* of the line sensor 61 for each predetermined number of sheets.

As described, by providing the cleaning unit 410 on the postprocessing apparatus 4 and cleaning the detection surface 161*a* of the line sensor 61 by the cleaning unit 410, the detection accuracy of the side edge 507 of the sheet by the line sensor 61 can be improved. Thereby, the positioning accuracy in the width direction W of the punching unit 62 can be improved, and holes can be punched highly accurately on the sheet.

Further according to the present embodiment, when the punching unit 62 moves in the width direction W by the shift motor M2, the nonwoven fabric 400 moves in an interlocked manner via the arm 401. Thus, the nonwoven fabric 400 can be moved by the shift motor M2 even if a motor for moving the nonwoven fabric 400 is not specifically provided, such that downsizing of the apparatus and cutting down of costs can be realized.

Further according to the present embodiment, only the area AR1 is configured to be cleaned in the detection surface 161*a* of the line sensor 61, and the area AR2 is not cleaned. Therefore, the cleaning time of the line sensor 61 by the cleaning unit 410 can be cut down.

Second Embodiment

Next, a second embodiment of the present invention will be described. According to the second embodiment, the area of the detection surface 161*a* of the line sensor 61 cleaned by the nonwoven fabric 400 differs from the first embodiment. Therefore, similar configurations as the first embodiment are either not shown in the drawings or denoted by the same reference numbers.

Figure 9A:
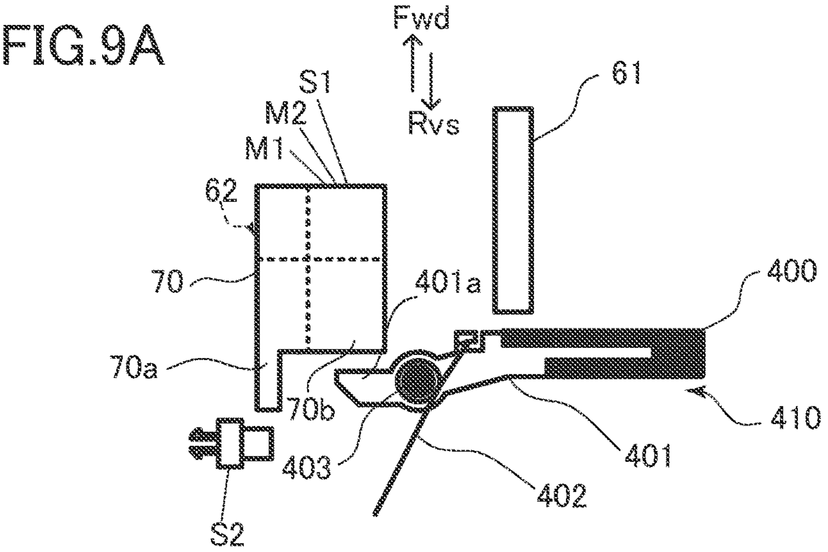
FIG. 9A is a plan view illustrating a cleaning unit according to a second embodiment.
Figure 9B:
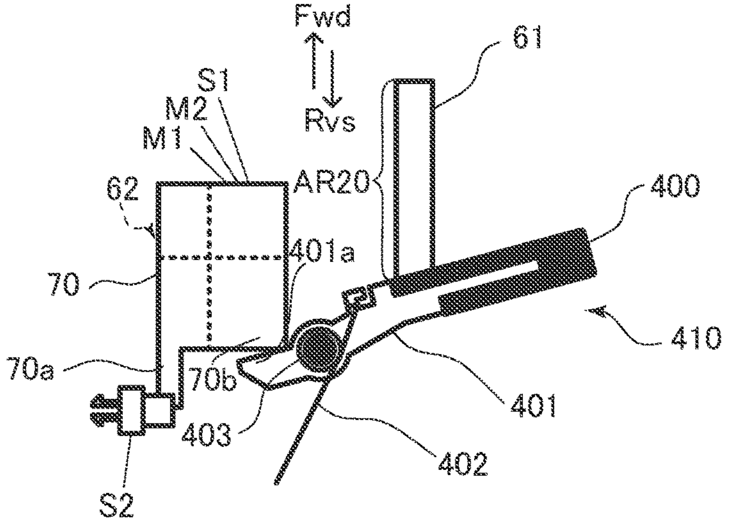
FIG. 9B is a plan view illustrating a state in which a punch base has been abutted against an arm.
Figure 9C:
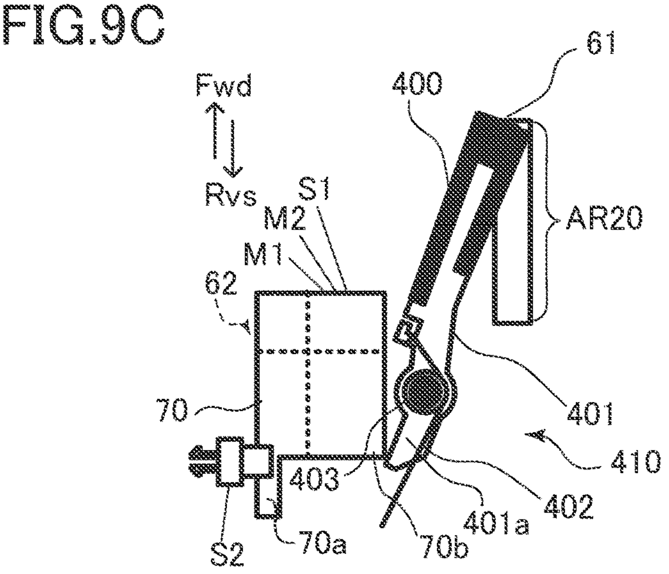
FIG. 9C is a plan view illustrating a state in which a nonwoven fabric has moved to a cleaning completion position.

According to the present embodiment, as illustrated in FIG. 9, the nonwoven fabric 400 cleans an entire area AR20 of the detection surface 161*a* of the line sensor 61. That is, the cleaning area of the detection surface 161*a* by the nonwoven fabric 400 can be adjusted arbitrarily according to the length of the nonwoven fabric 400, the distance from the pivot shaft 403 to the contact portion 401*a* or the nonwoven fabric 400, or the positional relationship between the light shielding portion 70*a* of the punch base 70 and the shift sensor S2.

As described, by providing the cleaning unit 410 on the postprocessing apparatus 4 and cleaning the entire area AR20 of the detection surface 161*a* of the line sensor 61 by the cleaning unit 410, the detection accuracy of the side edge 507 of the sheet by the line sensor 61 can be improved. Thereby, the positioning accuracy of the punching unit 62 in the width direction W can be improved, and holes can be punched highly accurately on the sheets.

Other Embodiments

In any of the embodiments described above, the cleaning control of the line sensor 61 by the cleaning unit 410 caused the nonwoven fabric 400 to move once in reciprocating motion on the detection surface 161*a*, but the present technique is not limited thereto. For example, by repeating the steps S609 to S613 of FIG. 8, the nonwoven fabric 400 can be made to move in reciprocating motion for a number of times on the detection surface 161*a*.

In any of the embodiments described above, the punch base 70 directly presses the arm 401 to pivot the arm 401 such that the nonwoven fabric 400 cleans the line sensor 61, but the present technique is not limited thereto. For example, it is possible to adopt a configuration in which the punch base 70 and the arm 401 are mutually connected via a gear train and the arm 401 is pivoted in linkage with the movement of the punching unit 62 and the punch base 70. Further, the nonwoven fabric 400 is not limited to being pivoted about the pivot shaft 403 by the arm 401, and for example, it may be attached to a slide member and moved in sliding motion in the width direction W.

In any of the embodiments described above, the nonwoven fabric 400 of the cleaning unit 410 is moved in linkage with the movement of the punching unit 62 and the punch base 70 in the width direction W, but the present technique is not limited thereto. For example, the arm 401 can be driven by a motor other than the shift motor M2, and the nonwoven fabric 400 can be swung thereby. For example, a conveyance motor M3 can be used as the motor for driving the arm 401, or an additional motor can be provided.

In any of the embodiments described above, the nonwoven fabric 400 is used as a cleaning portion for removing paper dust, but the present embodiment is not limited thereto. For example, woven fabric, flocking sheet or other members can be used instead of the nonwoven fabric 400, and the materials thereof are not limited. However, the cleaning portion for removing paper dust should preferably not damage or charge the detection surface 161*a* of the line sensor 61.

In any of the embodiments described above, the image forming apparatus 1 adopting an electrophotographic system has been described, but the present technique is not limited thereto. For example, the present technique can be adopted in an inkjet-type image forming apparatus for forming images on sheets by discharging ink through nozzles.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-186730, filed Nov. 17, 2021, which is hereby incorporated by reference herein in its entirety.

What is claimed is:

1. A sheet processing apparatus comprising:

a conveyance unit configured to convey a sheet in a sheet conveyance direction;

a punching unit configured to punch a hole to the sheet being conveyed by the conveyance unit;

a moving unit configured to move the punching unit in an intersecting direction intersecting the sheet conveyance direction;

a detection unit arranged upstream of the punching unit in the sheet conveyance direction and configured to change an output value based on a position of an edge portion, in the intersecting direction, of the sheet being conveyed;

a cleaning portion configured to clean the detection unit; and an interlocking portion configured to move the cleaning portion so as to clean the detection unit by interlocking with a movement of the punching unit in the intersecting direction.

2. The sheet processing apparatus according to claim 1, wherein the interlocking portion is configured to support the cleaning portion and move together with the cleaning portion by being pressed by the moving unit.

3. The sheet processing apparatus according to claim 2, wherein the interlocking portion is a pivot member configured to pivot about a pivot shaft by being pressed by the moving unit.

4. The sheet processing apparatus according to claim 1, wherein the moving unit is configured to retain the punching unit and move together with the punching unit in the intersecting direction, and wherein the sheet processing apparatus further comprises:

a movement detection unit configured to change an output value based on a position of the moving unit; and a drive source configured to drive based on the output value of the movement detection unit and move the moving unit in the intersecting direction.

5. The sheet processing apparatus according to claim 1, wherein the detection unit is a line sensor including a transparent member having a detection surface opposing a surface of the sheet being conveyed by the conveyance unit, and a plurality of light receiving elements arranged in the intersecting direction and configured to receive light passing through the transparent member, and wherein the cleaning portion is configured to clean the detection surface.

6. The sheet processing apparatus according to claim 5, wherein the cleaning portion is configured to clean at least a predetermined area of the detection surface, and wherein the predetermined area is an area between a position through which the edge portion of a minimum size sheet to which holes can be punched by the punching unit passes and a position through which the edge portion of a maximum size sheet to which holes can be punched by the punching unit passes.

7. The sheet processing apparatus according to claim 5, wherein the cleaning portion is configured to clean an entire area of the detection surface.

8. The sheet processing apparatus according to claim 5, wherein the cleaning portion is configured to remove a deposit on the detection surface.

9. The sheet processing apparatus according to claim 8, wherein the deposit is a paper dust discharged from the sheet.

10. The sheet processing apparatus according to claim 1, wherein the punching unit is configured to punch a hole to a sheet while the sheet is being conveyed by the conveyance unit.

11. The sheet processing apparatus according to claim 1, wherein the punching unit includes a punch that rotates about a shaft extending in the intersecting direction.

12. The sheet processing apparatus according to claim 1, further comprising:

a first conveyance path through which the sheet is received;

a reverse portion configured to reverse the sheet received from the first conveyance path;

a supporting portion configured to support the sheet being reversed by the reverse portion;

a second conveyance path extending downward from the first conveyance path and configured to receive the sheet being reversed by the reverse portion and guide the sheet to the supporting portion;

a discharge portion configured to discharge the sheet to an exterior;

a third conveyance path extending from the supporting portion toward the discharge portion and configured to guide the sheet to the discharge portion; and a rotary member pair arranged on the second conveyance path and configured to discharge the sheet to the supporting portion.

13. The sheet processing apparatus according to claim 12, wherein the punching unit is arranged on the first conveyance path.

14. The sheet processing apparatus according to claim 1, wherein the interlocking portion is configured to move the cleaning portion so as to clean the detection unit in a case where power of the sheet processing apparatus is turned on.

15. The sheet processing apparatus according to claim 1, wherein the interlocking portion is configured to move the cleaning portion so as to clean the detection unit in a case where a job of punching a hole to the sheet is started.

16. The sheet processing apparatus according to claim 1, wherein the interlocking portion is configured to move the cleaning portion so as to clean the detection unit after a job of punching a hole to the sheet is completed.

17. The sheet processing apparatus according to claim 1, wherein the interlocking portion is configured to move the cleaning portion so as to clean the detection unit each time a predetermined number of sheets passes through the detection unit.

18. An image forming system comprising:

the sheet processing apparatus according to claim 1, and an image forming unit configured to form an image on a sheet.

* * * * *